United States Patent
Wang et al.

(10) Patent No.: US 11,724,811 B2
(45) Date of Patent: Aug. 15, 2023

(54) OUTFLOW VALVE ASSEMBLY INCLUDING SOUND ABSORPTION AND AIRCRAFT INCLUDING THE SAME

(71) Applicant: Gulfstream Aerospace Corporation, Savannah, GA (US)

(72) Inventors: Tongan Wang, Savannah, GA (US); Paul Conti, Savannah, GA (US); John W. Maxon, Jr., Richmond Hill, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 811 days.

(21) Appl. No.: 16/681,625

(22) Filed: Nov. 12, 2019

(65) Prior Publication Data

US 2021/0139150 A1 May 13, 2021

(51) Int. Cl.
| | |
|---|---|
| *B64D 13/02* | (2006.01) |
| *B64F 5/10* | (2017.01) |
| *B64D 41/00* | (2006.01) |
| *G10K 11/16* | (2006.01) |
| *G10K 11/168* | (2006.01) |

(52) U.S. Cl.
CPC ............. *B64D 13/02* (2013.01); *B64D 41/00* (2013.01); *B64F 5/10* (2017.01); *G10K 11/161* (2013.01); *G10K 11/168* (2013.01)

(58) Field of Classification Search
CPC .... G10K 11/168; G10K 11/161; B64D 41/00; B64D 13/02; B64F 5/10
USPC .......................................................... 454/73
See application file for complete search history.

(56) References Cited

U.S. PATENT DOCUMENTS

| | | | | |
|---|---|---|---|---|
| 3,740,006 A | * | 6/1973 | Maher | B64D 13/02 244/1 N |
| 5,834,711 A | | 11/1998 | Haines | |
| 6,668,970 B1 | * | 12/2003 | Lee | F24F 13/24 181/224 |
| 2011/0177770 A1 | * | 7/2011 | Tanner | B64D 13/04 251/304 |
| 2013/0255176 A1 | * | 10/2013 | Roberts | E04G 1/153 181/290 |
| 2016/0229540 A1 | * | 8/2016 | Loukusa | B60H 1/00564 |
| 2017/0275012 A1 | * | 9/2017 | Tretow | B64D 33/04 |

(Continued)

FOREIGN PATENT DOCUMENTS

| | | | |
|---|---|---|---|
| WO | 9938773 A1 | 8/1999 | |
| WO | 2007050536 A1 | 5/2007 | |
| WO | WO-2011051148 A2 | * 5/2011 | ........... B64D 11/003 |

*Primary Examiner* — Forrest M Phillips
(74) *Attorney, Agent, or Firm* — LKGlobal | Lorenz & Kopf, LLP (57) ABSTRACT

Outflow valve assemblies for an aircraft, aircraft including an outflow valve assembly, and methods for installing an outflow valve assembly on an aircraft, are provided. In one example, an outflow valve assembly includes a louver that is movably disposed to at least partially cover an opening formed through a fuselage on an aircraft. A motor is coupled to the louver and is configured to move the louver between a closed position to obstruct fluid communication through the opening and an open position to allow fluid communication through the opening between inside and outside of the aircraft. A sound absorptive panel is disposed adjacent to the opening to attenuate noise that is generated when the louver is in the open position.

20 Claims, 5 Drawing Sheets

(56) References Cited

U.S. PATENT DOCUMENTS

| | | | |
|---|---|---|---|
| 2018/0018952 A1* | 1/2018 | Herrera | B32B 27/20 |
| 2018/0127100 A1* | 5/2018 | Roth | B64C 1/066 |
| 2018/0370610 A1* | 12/2018 | Sankrithi | B64D 11/06 |
| 2019/0061903 A1 | 2/2019 | Khorrami et al. | |
| 2021/0086888 A1* | 3/2021 | Yovich | G10K 11/162 |
| 2022/0203649 A1* | 6/2022 | Schulze | B32B 5/18 |

* cited by examiner

OUTFLOW VALVE ASSEMBLY INCLUDING SOUND ABSORPTION AND AIRCRAFT INCLUDING THE SAME

TECHNICAL FIELD

The technical field relates generally to an outflow valve for an aircraft, and more particularly, relates to an outflow valve assembly for an aircraft including noise attenuation, an aircraft including such an outflow valve assembly, and a method for assembling such an outflow valve assembly to an aircraft.

BACKGROUND

Outflow valves are commonly used in aircraft to vent the interior of the aircraft including the cockpit and cabin areas and to adjust cabin pressure. During flight, when air flows into the interior of the aircraft, for example from an on-board pressurizing system, a positive pressure relative to the outside of the aircraft is created within the aircraft interior. The outflow valve includes one or more flaps or louvers that are placed in an opening that is formed through the fuselage of the aircraft. The louver(s) of the outflow valve can be adjustably opened to define a flow cross-section that regulates the amount of air allowed to escape through the opening to adjust and/or maintain the desired level of cabin pressure.

High speed air flows (e.g., at approximately the speed of the aircraft) through the outflow valve, particularly across the louver(s), generate broadband noise. This noise is transmitted through the interior of the aircraft including into the cockpit area and/or cabin area and can be disturbing. Unfortunately, various approaches for blocking the noise along its transmission path to the cockpit and/or cabin area(s) have been inefficient, costly, and/or have added significant weight to the aircraft.

Accordingly, it is desirable to provide an outflow valve assembly that addresses one or more of the foregoing issues, an aircraft including such an outflow valve assembly, and a method for assembling such an outflow valve assembly to an aircraft. Furthermore, other desirable features and characteristics of the various embodiments described herein will become apparent from the subsequent detailed description and the appended claims, taken in conjunction with the accompanying drawings and this background.

SUMMARY

Various non-limiting embodiments of an outflow valve assembly for an aircraft having a fuselage that at least partially surrounds an interior, an aircraft including an outflow valve assembly, and a method for assembling an outflow valve assembly to an aircraft, are provided herein.

In a first non-limiting embodiment, the outflow valve assembly includes, but is not limited to, a louver that is configured to be movably disposed to at least partially cover an opening formed through the fuselage. The outflow valve assembly further includes, but is not limited to, a motor that is coupled to the louver and that is configured to move the louver between a closed position to obstruct fluid communication through the opening and an open position to allow fluid communication through the opening between the interior and outside of the aircraft. The outflow valve further includes, but is not limited to, a sound absorptive panel that is configured to be disposed adjacent to the opening to attenuate noise that is generated when the louver is in the open position.

In another non-limiting embodiment, the aircraft includes, but is not limited to, a fuselage that at least partially surrounds an interior and that has an opening formed therethrough to provide fluid communication between the interior and outside of the aircraft. The aircraft further includes, but is not limited to, an outflow valve assembly. The outflow valve assembly includes, but is not limited to, a louver that is movably disposed to at least partially cover the opening. The outflow valve assembly further includes, but is not limited to, a motor that is operatively coupled to the louver to move the louver between a closed position to obstruct fluid communication through the opening and an open position to allow fluid communication through the opening between the interior and the outside of the aircraft. The outflow valve assembly further includes, but is not limited to, a sound absorptive panel that is disposed adjacent to the opening to attenuate noise that is generated when the louver is in the open position.

In another non-limiting embodiment, the method includes, but is not limited to, movably disposing a louver to at least partially cover an opening formed through the fuselage. The method further includes, but is not limited to, coupling a motor to the louver. The motor is configured to move the louver between a closed position to obstruct fluid communication through the opening and an open position to allow fluid communication through the opening between the interior and outside of the aircraft. The method further includes, but is not limited to, disposing a sound absorptive panel adjacent to the opening to attenuate noise that is generated when the louver is in the open position.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to an outflow valve assembly for an aircraft, an aircraft including an outflow valve assembly, and a method for assembling an outflow valve assembly to an aircraft. The aircraft includes a fuselage that at least partially surrounds an interior and has an opening formed therethrough to provide fluid communication between the interior and outside of the aircraft.

In an exemplary embodiment, the outflow valve assembly is disposed in the interior about the opening and includes an outflow valve subassembly and at least one sound absorptive panel. The outflow valve subassembly includes a louver(s) that is movably disposed to at least partially cover the opening. A motor is operatively coupled to the louver to move the louver between a closed position to obstruct fluid communication through the opening and an open position to allow fluid communication through the opening between the interior and outside of the aircraft.

The sound absorptive panel(s) is disposed adjacent to the opening to attenuate noise that is generated when the louver is in the open position, for example as air rapidly advances over the louver between the interior and outside of the aircraft. In an exemplary embodiment, advantageously by attenuating the noise proximate to its source of generation, the noise can be efficiently and effectively attenuated to prevent or substantially prevent the noise from being transmitted into other areas of the aircraft, such as, for example, the cockpit and/or cabin area(s).

FIGS. 1-4 illustrate various views of an outflow valve assembly 10 arranged in an interior 12 of an aircraft 14 in accordance with an exemplary embodiment. The aircraft 14 includes a fuselage 16 that at least partially surrounds the interior 12 of the aircraft 14. The fuselage 16 has an opening 18 formed therethrough for providing fluid communication between the interior 12 and outside 20 of the aircraft 14.

As illustrated, the outflow valve assembly 10 is disposed in the interior 12 about the opening 18. In an exemplary embodiment, the outflow valve assembly 10 includes an outflow valve subassembly 22 and sound absorptive panels 24, 26, 28, and 30.

In an exemplary embodiment, the outflow valve subassembly 22 includes louvers 32 and 34, arms 36 and 38, and a motor 40. The louvers 32 and 34 are movably disposed in the opening 18 in which each of the louvers can be moved to cover a corresponding portion of the opening 18. As illustrated, the louver 34 is in a closed position 42 to obstruct a corresponding portion of the opening 18 while louver 32 is in an open position 44 to allow fluid communication through a corresponding portion of the opening 18 between the interior 12 and outside 20 of the aircraft 14. Although the louver 32 is shown in the open position 44 and the louver 34 is shown in the closed position 42, it is to be understood that the louvers 32 and 34 can be moved independently between the closed and open positions 42 and 44. When all of the louvers 32 and 34 are in the closed positions 42, the openings 18 are completely or substantially covered and therefore, obstructed to substantially prevent any fluid communication through the opening 18 between the interior 12 and outside 20 of the aircraft 14. Likewise, when one or more of the louvers 32 and 34 is in the open position(s) 44, fluid communication through the opening 18 between the interior 12 and outside 20 of the aircraft 14 occurs with high speed air (e.g., traveling at about the speed of the aircraft 14 in flight) rushing over the louver(s) 32 and/or 34, thereby generating noise.

In an exemplary embodiment, the arm 36 operatively couples the motor 40 to the louver 32 while the arm 38 operatively couples the louver 32 to the louver 34 to correspondingly move the louvers 32 and 34 between the closed and open positions 42 and 44. As illustrated, the arm 36 has a proximal end 46 that is coupled to the motor 40 and a distal end 48 that is pivotably coupled to a louver weldment 50 that extends upwardly from the interior facing side 52 of the louver 32. In response to a command signal to adjust the cabin pressure via opening one or more of the louvers 32 and/or 34, the motor 40 responds by driving the arm 36 to move the louver 32, which drives the arm 38 to move the louver 34 from the closed position(s) 42 to the open position(s) 44 or vice versa.

The sound absorptive panels 24, 26, 28, and 30 are arranged adjacent to the opening 18 to attenuate noise that is generated when one or more of the louvers 32 and/or 34 are in the open position 44. As illustrated, the sound absorptive panels 24, 26, 28, and 30 are coupled together (e.g., via metal brackets, fasteners, and/or the like) to form a sound absorptive wall 54 that encloses (e.g., substantially or fully surrounds) at least a lower subassembly portion 56 that includes the louvers 32 and 34 and optionally at least the lower portions of the arm 36. As such, the sound absorptive wall 54 substantially or fully surrounds the opening 18 and the louvers 32 and 34 to efficiently and effectively attenuate the noise proximate to its source of generation to prevent or substantially prevent the noise from being transmitted into other areas of the aircraft 14 (e.g., cockpit and/or cabin areas). To maintain pressurization through the flow, only a portion of the sound absorptive panels 24, 26, 28 and 30 may be installed adjacent to the opening 18 and the sound absorptive wall 54 may or may not fully enclose the lower assembly portion 56.

Figure 5:
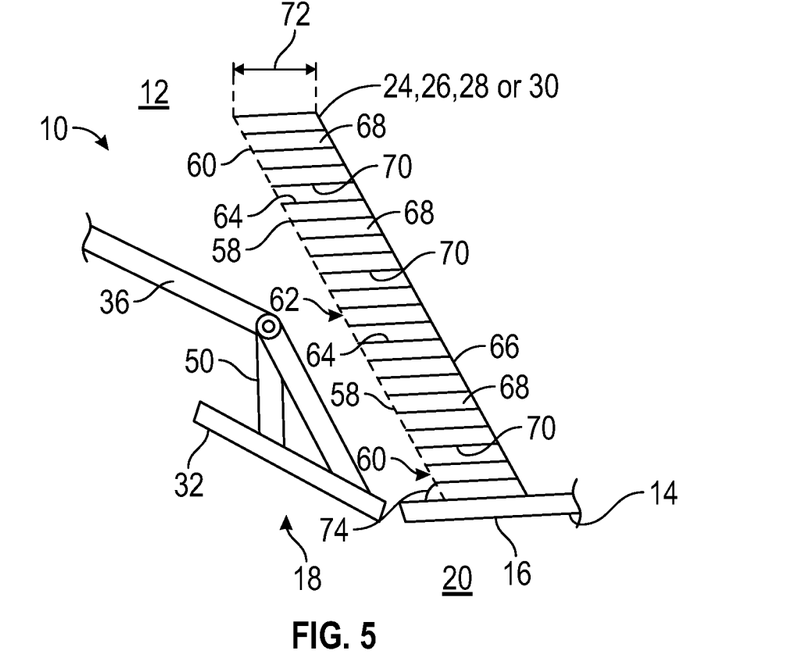
FIG. 5 illustrates cross-sectional view a portion of an outflow valve assembly disposed in an interior of an aircraft in accordance with an exemplary embodiment.

Referring to FIG. 5, in an exemplary embodiment, each of the sound absorptive panels 24, 26, 28, and/or 30 include a porous layer 58 that has an outer porous surface 60 that is disposed adjacent to and faces towards the louvers 32 and 34. The porous layer 58 has pores 62 formed therethrough that permit molecular oscillation through the porous layer 58. Not to be limited by theory, in an exemplary embodiment, it is believed that noise is transmitted by wavelike movement of air molecules and that by permitting the oscillation of these air molecules in the porous layer 58, the noise is converted to heat energy thereby attenuating the noise.

In an exemplary embodiment, the porous layer 58 is made of a structural material that is suitable for maintaining its integrity and enactment in this relatively harsh environment caused by the rapid flow of air over the louvers 32 and 34 through the opening 18. For example, the porous layer 58 includes or is formed of a porous metal material, such as metal felt, a perforated or micro-perforated metal layer(s), or the like. In an exemplary embodiment, the porous layer 58 includes or is formed of metal felt.

In an exemplary embodiment, the porous layer 58 has an acoustic flow resistivity of from about 5 to about 50 rayls CGS.

As illustrated, the sound absorptive panels 24, 26, 28, and/or 30 each further includes a second or intermediate layer 64 that is disposed adjacent to the porous layer 58 opposite the outer porous surface and a third solid layer 66 that is disposed adjacent to the intermediate layer 64 opposite the porous layer 58. As illustrated, the intermediate layer 64 has openings 68 that are in fluid communication with the pores 62. Without being limited by theory, in an exemplary embodiment, it is believed that noise which passes through the pores 62 travels through the openings 68 to the solid layer 66 where the noise is reflected, traveling back again through the openings 68 to the porous layer 58 for further attenuation.

In an exemplary embodiment, the intermediate layer 64 is or includes a honeycomb structure 70 in which each of the openings 68 in the honeycomb structure 70 has a diameter or maximum cross-sectional dimension of from about 0.125 to about 1.5 inches. In an exemplary embodiment, the honeycomb structure 70 is formed of a structural material such as a metal material, e.g., metal honeycomb structure, a composite material such as a Nomex honeycomb product, or the like. In another exemplary embodiment, the intermediate layer 64 is fully or partially filled with porous fibrous or foam material.

In an exemplary embodiment, the solid layer 66 is formed of a nonporous solid structural material, such as a fiber reinforced composite material, a metal material, or the like. In an exemplary embodiment, the sound absorptive panels 24, 26, 28, and/or 30 each have a total thickness (indicated by double headed arrow 72) from about 0.25 to about 10 inches, for example a total thickness 72 from about 0.5 to about 6 inches.

Figure 1:
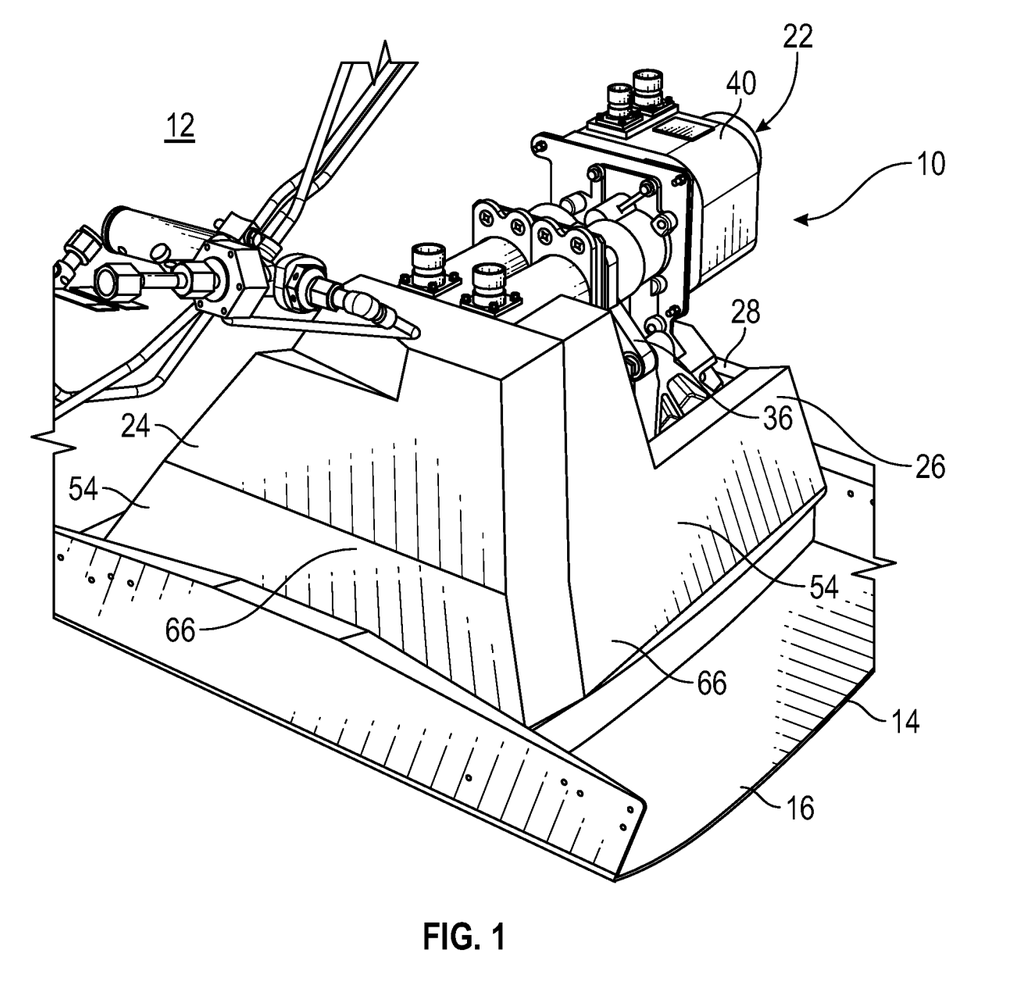
FIG. 1 illustrates a perspective view of an outflow valve assembly disposed in an interior of an aircraft in accordance with an exemplary embodiment.
Figure 2:
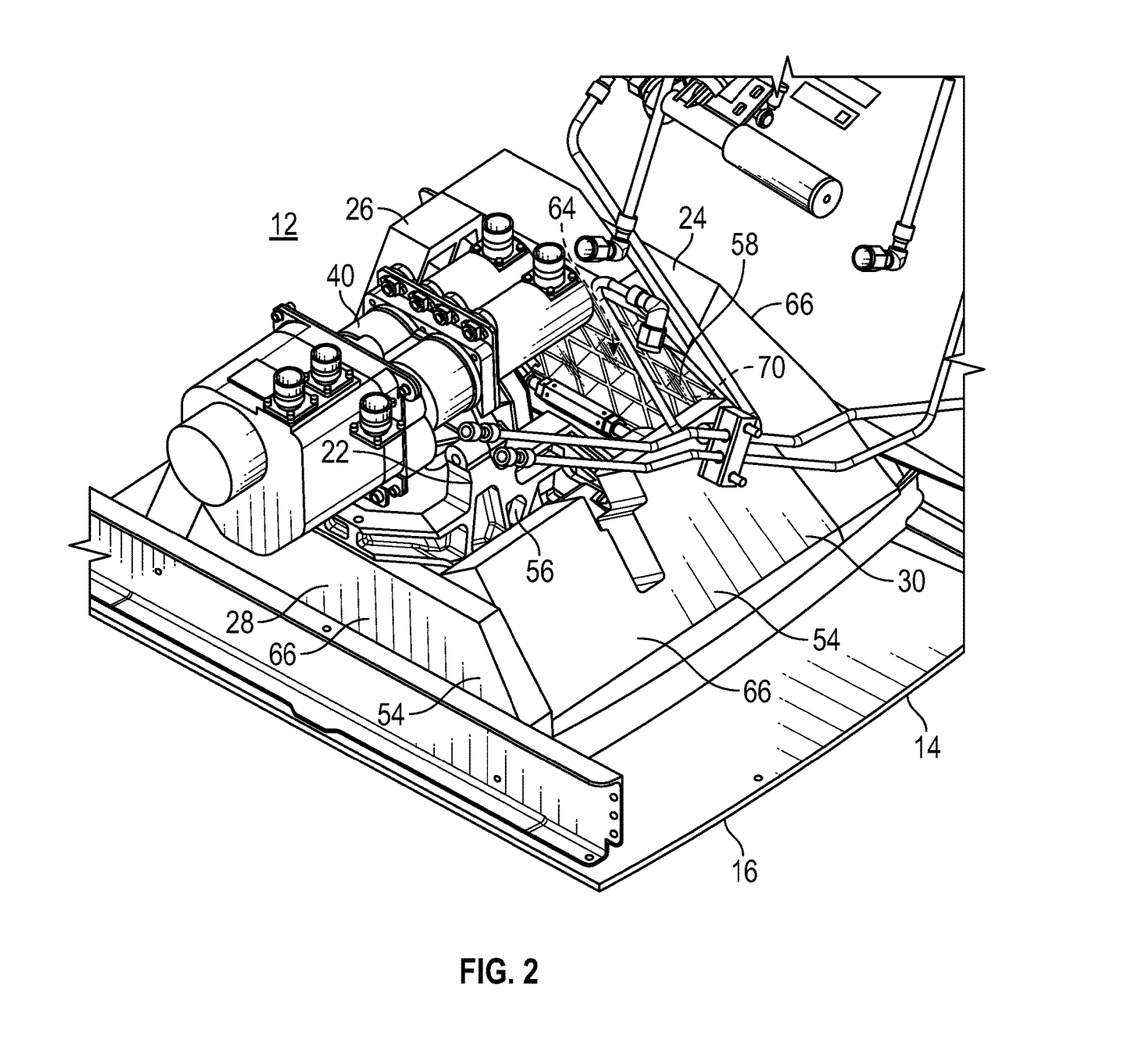
FIG. 2 illustrates a perspective view of an outflow valve assembly disposed in an interior of an aircraft in accordance with an exemplary embodiment.
Figure 3:
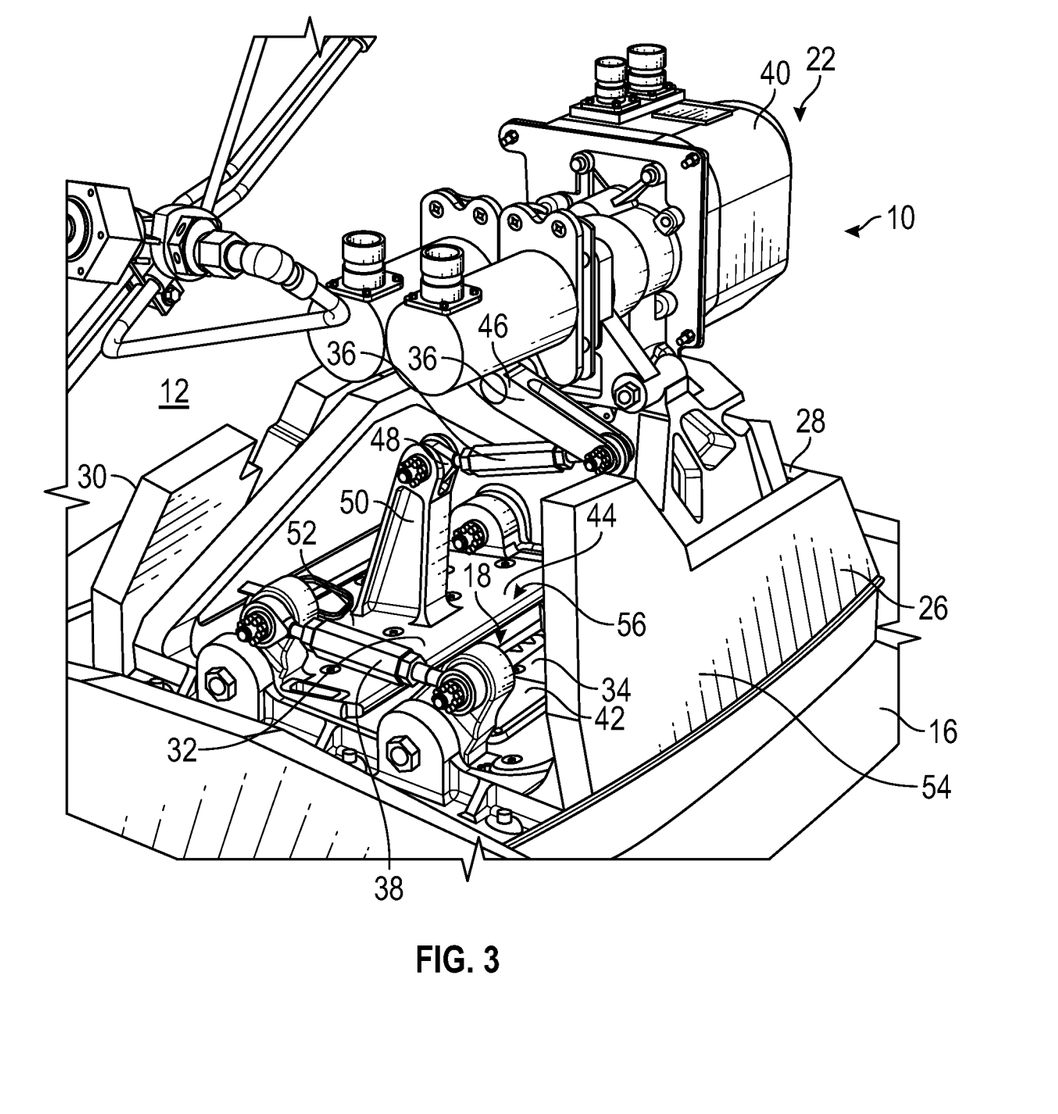
FIG. 3 illustrates a perspective view of an outflow valve assembly disposed in an interior of an aircraft in accordance with an exemplary embodiment.
Figure 4:
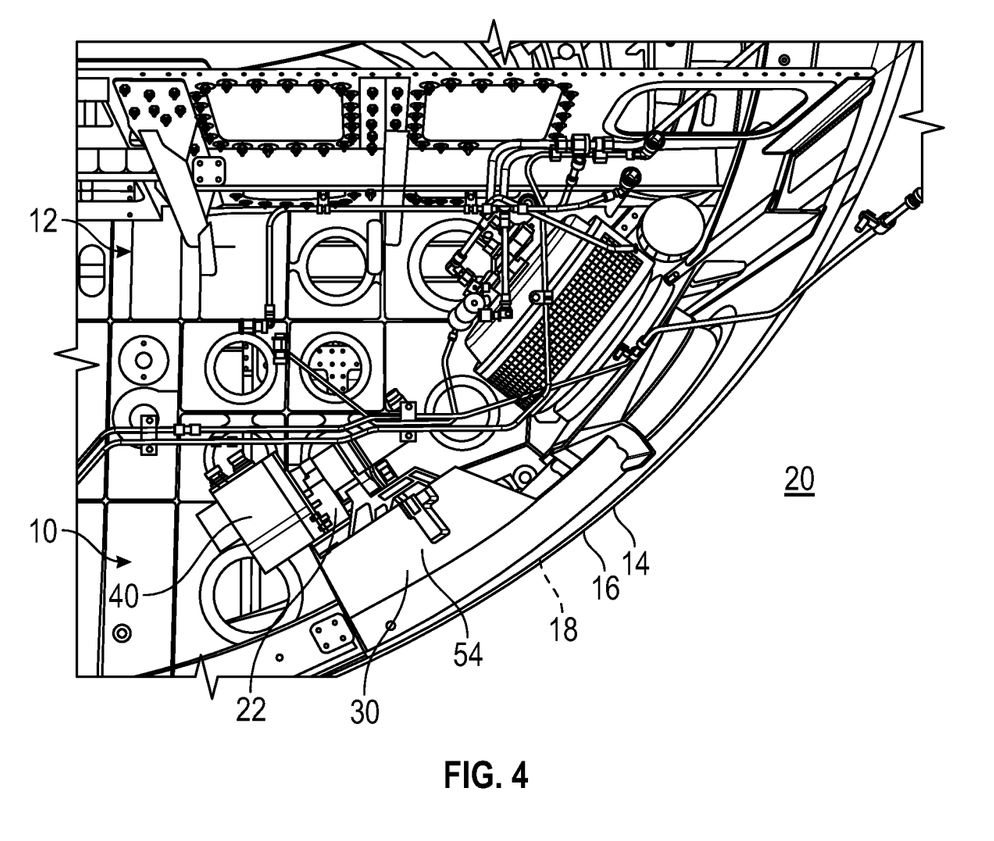
FIG. 4 illustrates a sectional side view of an outflow valve assembly disposed in an interior of an aircraft in accordance with an exemplary embodiment.

Referring to FIGS. 1-2 and 5, in an exemplary embodiment, one or more of the sound absorptive panels 24, 26, 28, and/or 30 slant inwardly towards the outflow valve subassembly 22 in a direction (upwardly) from the lower subassembly portion 56 towards the motor 40. In an exemplary embodiment, one or more of the sound absorptive panels 24, 26, 28, and/or 30 slant inwardly at an angle 74 from about 45° to about 85°.

Figure 6:
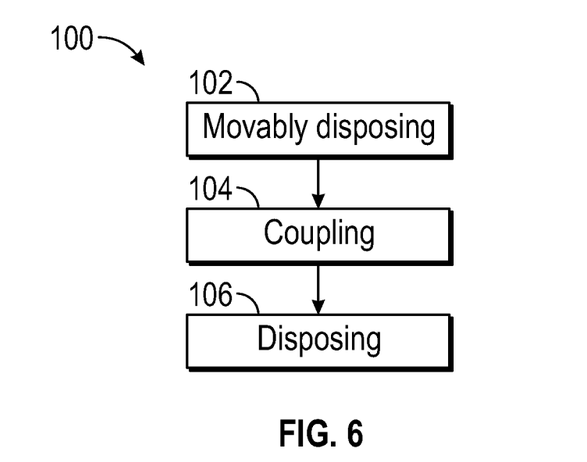
FIG. 6 illustrates a method for assembling an outflow valve assembly to an aircraft in accordance with an exemplary embodiment.

FIG. 6 illustrates a method 100 for assembling an outflow valve assembly to an aircraft in accordance with an exemplary embodiment. The method 100 includes movably disposing (STEP 102) a louver to at least partially cover an opening formed through the fuselage.

A motor is coupled (STEP 104) to the louver. The motor is configured to move the louver between a closed position to obstruct fluid communication through the opening and an open position to allow fluid communication through the opening between the interior and outside of the aircraft. A sound absorptive panel is disposed (STEP 106) adjacent to the opening to attenuate noise that is generated when the louver is in the open position.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An outflow valve assembly for an aircraft having a fuselage that at least partially surrounds an interior of the aircraft, the outflow valve assembly comprising:
    a louver configured to be movably disposed to at least partially cover an opening formed through the fuselage;
    a motor disposed in the interior of the aircraft, coupled to the louver, and configured to move the louver between a closed position to obstruct fluid communication through the opening and an open position to allow fluid communication through the opening between the interior and outside of the aircraft; and
    a plurality of sound absorptive panels disposed adjacent to the opening to attenuate noise that is generated when the louver is in the open position, wherein the plurality of sound absorptive panels are disposed in the interior of the aircraft, and are coupled together to form a sound absorptive wall that encloses at least a lower subassembly portion of the outflow valve assembly that includes the louver.

2. The outflow valve assembly of claim 1, wherein the sound absorptive panels comprise a first porous layer that has an outer porous surface configured to be disposed adjacent to the louver and that has pores formed therethrough that permit molecular oscillation through the first porous layer.

3. The outflow valve assembly of claim 2, wherein the first porous layer comprises one of metal felt and a perforated or micro-perforated metal layer.

4. The outflow valve assembly of claim 2, wherein the first porous layer has an acoustic flow resistivity of from about 5 to about 50 rayls CGS.

5. The outflow valve assembly of claim 2, wherein the sound absorptive panels comprise a second layer that is disposed adjacent to the first porous layer opposite the outer porous surface and that has openings in fluid communication with the pores.

6. The outflow valve assembly of claim 5, wherein the second layer is fully or partially filled with porous fibrous or foam materials.

7. The outflow valve assembly of claim 5, wherein the second layer comprises a honeycomb structure.

8. The outflow valve assembly of claim 5, wherein the openings each have a maximum cross-sectional dimension of from about 0.125 to about 1.5 inches.

9. The outflow valve assembly of claim 5, wherein the sound absorptive panels comprise a third solid layer that is disposed adjacent to the second layer opposite the first porous layer.

10. The outflow valve assembly of claim 9, wherein the third solid layer comprises one of a fiber reinforced composite material and a metal material and forms a rain barrier for the outflow valve assembly.

11. The outflow valve assembly of claim 1, wherein the sound absorptive panels have a total thickness of from about 0.25 to about 10 inches.

12. The outflow valve assembly of claim 1, wherein the sound absorptive panels slant inwardly towards an outflow valve subassembly in a direction from the lower subassembly portion to an upper subassembly portion of the outflow valve assembly.

13. The outflow valve assembly of claim 12, wherein the sound absorptive panels slant inwardly at an angle of from about 45° to about 85°.

14. An aircraft comprising:
    a fuselage at least partially surrounding an interior of the aircraft and having an opening formed therethrough to provide fluid communication between the interior and outside of the aircraft; and
    an outflow valve assembly comprising:
        a louver movably disposed to at least partially cover the opening;
        a motor disposed in the interior of the aircraft and operatively coupled to the louver to move the louver between a closed position to obstruct fluid communication through the opening and an open position to allow fluid communication through the opening between the interior and the outside of the aircraft; and a plurality of sound absorptive panels disposed adjacent to the opening to attenuate noise that is generated when the louver is in the open position, wherein the plurality of sound absorptive panels are disposed in the interior of the aircraft, and are coupled together to form a sound absorptive wall that encloses at least a lower subassembly portion of the outflow valve assembly that includes the louver.

15. The aircraft of claim 14, further comprising an arm that has a first end portion that is coupled to the louver and a second end portion that is coupled to the motor, wherein the motor is configured to drive the arm to move the louver between the closed position and the open position.

16. The aircraft of claim 14, wherein the sound absorptive panels slant inwardly in a direction from the lower subassembly portion to an upper subassembly portion of the outflow valve assembly.

17. The aircraft of claim 16, wherein the sound absorptive panels slant inwardly at an angle of from about 45° to about 85°.

18. The aircraft of claim 14, wherein the outflow valve subassembly further includes at least one additional louver that is movably disposed to at least partially cover the opening and at least one additional arm that directly or indirectly couples the at least one additional louver to the motor to move the at least one additional louver between the closed and open positions.

19. The aircraft of claim 14, wherein the sound absorptive panels each comprises a first porous layer that has an outer porous surface that faces towards at least the lower subassembly portion of the outflow valve assembly and that has pores formed therethrough that permit molecular oscillation through the first porous layer.

20. The aircraft of claim 19, wherein the sound absorptive panels of the sound absorptive wall each further comprises:
a second layer that is disposed adjacent to the first porous layer opposite the outer porous surface and that has openings in fluid communication with the pores; and
a third solid layer that is disposed adjacent to the second layer opposite the first porous layer.

\* \* \* \* \*